May 28, 1963  J. HENRY-BAUDOT  3,091,711
PRINTED CIRCUIT MOTOR

Filed April 15, 1960  2 Sheets-Sheet 1

Inventor:
Jacques Henry-Baudot
By Kemon, Palmer & Stewart

United States Patent Office 3,091,711
Patented May 28, 1963

3,091,711
PRINTED CIRCUIT MOTOR
Jacques Henry-Baudot, Antony, France, assignor to Printed Motors Inc., New York, N.Y.
Filed Apr. 15, 1960, Ser. No. 22,506
Claims priority, application France May 4, 1959
9 Claims. (Cl. 310—68)

The present invention concerns electric rotating machines incorporating multipolar inductor or field windings made in accordance with the so-called "printed circuit" techniques, i.e. made of flat conductors intimately adhering over an insulating surface carrier.

The invention more particularly relates to axial airgap machines incorporating such multipolar field windings. In such machines, the inductor winding is developed along a ring of a disc-shaped carrier and, preferably, said winding is made on the two opposite faces of said carrier since at least parts of the supply connections are made on the face of said carrier opposite to the airgap face of the winding. Also, preferably the winding proper is made of two sets of half-turns respectively applied to the opposite faces of said carrier, face-to-face connections between the ends of the half-turns completing the pattern of the winding.

It is well known that such "printed" windings have a quite low impedance so that their use necessitates the recourse to voltage lowering transformers. It is an object of the invention to provide the incorporation of such a transformer in an electrical rotating machine of the above-defined kind.

According to the invention, the secondary winding of the supply transformer for a "printed circuit" inductor winding machine is also made of flat and bare conductors intimately adhering to an insulating surface carrier which is the same as the insulating surface carrier on which is formed the said winding.

According to a further feature of the invention, the connections between the said secondary winding and the supply terminals of the winding are made integral on said common carrier to both the winding conductors connecting said terminals and the ends of the secondary winding for said supply.

According to a further feature of the invention, said common insulating carrier is a thin insulating sheet and both the secondary winding and the inductor winding are formed thereon, and the whole is applied over a magnetic base plate making part of both the magnetic circuit of the transformer and the magnetic circuit of the rotating machine.

For further disclosing the invention, reference is made to an illustrative embodiment thereof concerning the supply of a squirrel-cage asynchronous motor the stator inductor winding of which is made of a two-face printed winding applied over a magnetic base plate formed of insulating material and incapable of producing eddy currents; said winding being of the series-wave pattern developed over an annular area. Obviously the invention is not limited to such a type of A.C. supplied printed winding machine.

Figure 4:
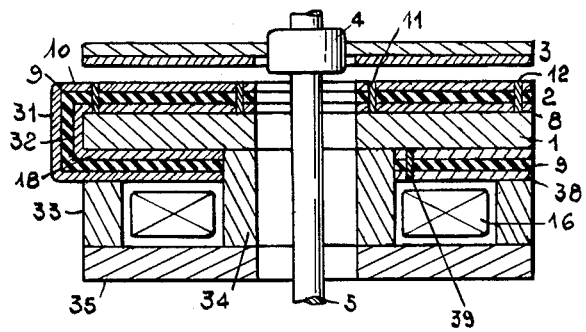
FIG. 4 shows a cross-section of a second embodiment of the invention.
Figure 5:
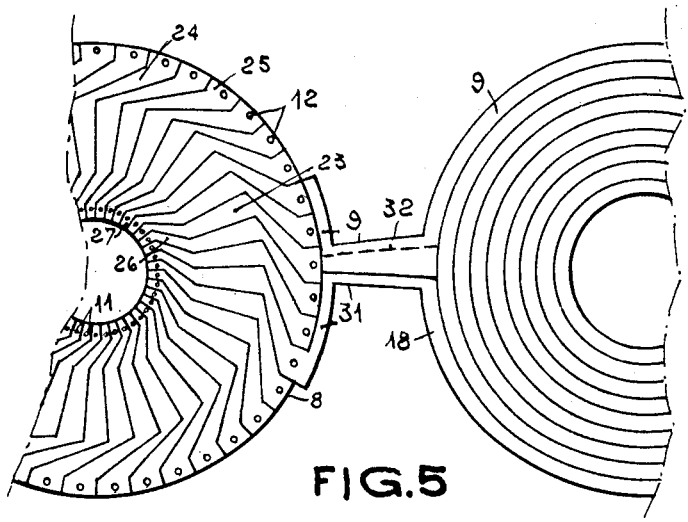
Figures 6, 7:
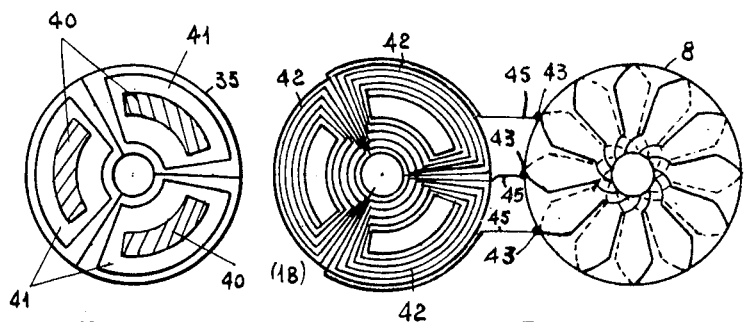

FIG. 5 shows a partial top view of the "printed" part of the machine of FIG. 4 before shaping it for application in the structure of FIG. 4; and FIG. 6, in a partial top view of the transformer, and FIG. 7, in a top view of the printed part of the machine, show jointly an adaptation of the preceding arrangements for a polyphased transformer and a polyphased winding. Said multi-phase arrangement is for instance disclosed for a three-phase supply and machine.

Figure 1:
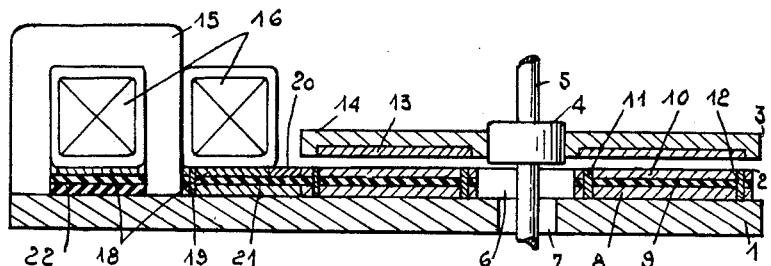
FIG. 1 shows a cross-section of a first embodiment of the invention.
Figure 2:
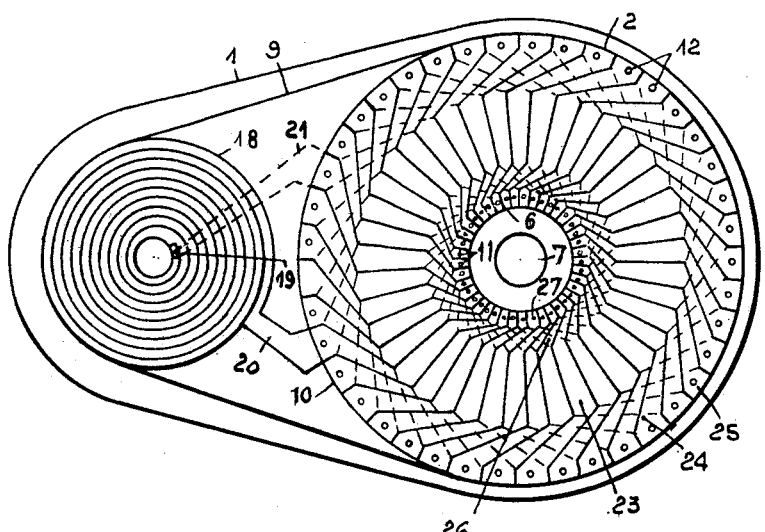
FIG. 2 shows a top view of the stator part of said machine.

Referring first to FIGS. 1 and 2, 1 is a magnetic plate of such a material as non-conducting ferrite, the shape of which may be that shown in FIG. 2. Over part of this plate is secured a stator winding 2 forming the inductor of the machine and being a series-wave single-phase winding of forty-one turns. This winding comprises two sets of half-turns, 8 and 10, on opposite faces of a thin insulating sheet or carrier 9, through-connections such as 11 and 12 closing the turns for the pattern of said winding. Illustratively, in said winding, each half-turn conductor comprises a radially extending portion 23 and slanted end portions 24 and 26 ending in short terminals 25 and 27 for establishment of said face-to-face connections 11 and 12. Such two-faced windings are described in more detail and are claimed in my co-pending application Serial No. 1128, filed January 7, 1960. Two taps spanned by 180 electrical degrees are provided in said winding and at such locations, the half-turn conductors are continuously extended by integral conductive coatings 20 and 21 reaching the ends of a conductive spiral 18. At 19 is shown the location of the through connection joining the conductive coating 21 to the center point of the spiral 18. Said spiral is, in FIG. 2, shown as being printed on a single side of the insulating sheet 9. Said spiral is applied, if necessary, with recourse to a further insulating ring 22, onto the yoke magnetic plate 1.

On top of the spiral 18 constituting the secondary winding of a transformer, is mounted a primary winding 16 of conventional winding manufacture in the form of a solenoid enclosing one leg of a magnetic circuit 15 of U-shape which closes the magnetic circuit of the transformer passing through that part of the yoke 1 lying under the spiral winding 18. Accordingly both the secondary winding 18 of the transformer and the field winding supplied by said transformer are unitarily formed and supported and, further, their magnetic circuit also comprises a unitary member.

Figure 3:
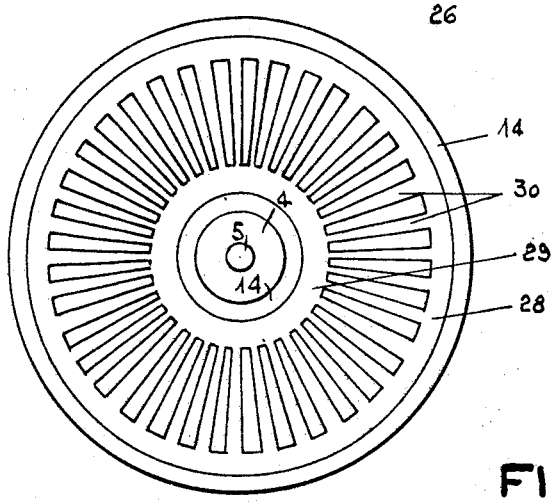
FIG. 3 shows an under view of the rotor.

The machine further includes a rotor 3 carried by a hub 4 on a shaft 5. The magnetic yoke plate 1 is perforated at 7 for the passage of the shaft 5 and the insulating sheet 9 is perforated by a hole 6 for the same purpose. The bearings are not shown. The structure of the rotor is easily understood: on a magnetic plate or disc 14, depressions are formed on one face according to the "negative picture" of the squirrel-cage winding and a conductive coating 13 of substantial thickness is secured and formed within the depressions; said coating comprising, FIG. 3, two rings 29 and 28 integrally joined by radial and sectoral conductor bars 30 equally spaced about the axis of the rotor.

Instead of developing the structure so that the transformer and the rotating machines are placed side by side on a common base plate, it may be preferred to make the transformer coaxial with the machine. Of course, the secondary winding must be left outside the magnetic airgap. The complete arrangement is more compact as shown in FIG. 4.

In addition to the advantage of compactness, the coaxial arrangement gives a further possibility of applying the invention to the case wherein the armature winding is the rotating part of the machine as it will then suffice to have the complete motor/transformer unit to rotate, the primary being fed from sliding contact terminals.

In the structure of FIG. 4, the secondary winding 18 of the transformer has an area coverage substantially equal to that of the inductor winding of the machine and the connections 31 and 32 between the outputs of the secondary winding 18 and the taps on the field winding extend around the side edge of the common disc-like supporting base plate 1, see FIG. 4. The thin insulating sheet 9 is suitably cut for this purpose and, after the printing thereon of the secondary and inductor winding and connections therebetween, the sheet is suitably folded across one edge of base plate 1 so that different portions of the printed circuit are applied closely to opposite faces of said base plate. Before folding, the printed member is as shown in FIG. 5.

The transformer structure is completed by a pair of magnetic cores 33 and 34 and a base magnetic plate 35, the primary winding 16 is housed within the toroidal cavity thus defined.

The above described examples refer to single-phase windings and transformers. The invention is of course obviously applicable to multi-phase windings and transformers and, for instance, in the case of a three-phase supply, FIG. 6 shows the modification of cross-section of the magnetic circuit of the transformer of FIG. 4. It comprises three branches 40 in the shape of arcuate portions of a cylinder, cooperating with three primary coils 41. This assembly is applied against the yoke 35. In FIG. 7 is shown the "printed" secondary winding and also the "printed" three-phase winding. The secondary winding comprises three sectoral flat coils 42 which are considered as connected in delta or triangle relation. Each of said solenoidal coils has an output 45 connected to an input tap 43 of the stator winding of the machine. Said taps are provided at three points spaced apart by 120° electrical degrees. The machine winding is more sketchily shown than the one of FIG. 2 for the sake of clarity.

What is claimed is:

1. An electric rotating machine of the axial airgap type comprising a thin sheet-like insulating carrier, a multipolar field winding of low impedance to alternating current including flat conductors with input connections mounted on one portion of said carrier, a transformer integral with said machine including a secondary winding of flat conductors with output connections carried by a second portion of said carrier and connected to the said field winding input connections, said transformer including a primary winding having a magnetic circuit coupled to said secondary winding.

2. An electric rotating machine accoring to claim 1 wherein the said secondary output connections of the transformer and the said field winding input connections are integral with both said windings and all carried by said insulating carrier.

3. An electric rotating machine according to claim 2, further comprising a common base plate supporting said transformer and said field winding, and a rotor carried by said base plate for rotation adjacent said field winding.

4. An electric rotating machine according to claim 3 wherein the said base plate is made of an anisotropic magnetic material having high resistance to the flow of eddy currents.

5. An electric rotating machine according to claim 4 wherein said base plate is formed of insulating material.

6. An electric rotating machine according to claim 3 wherein the said magnetic circuit coupling the two transformer windings is pot-shaped and wherein said common base plate serves as a magnetic yoke to complete said magnetic circuit.

7. An electric rotating machine according to claim 3 wherein the said common base plate is of an elongated shape and supports the said transformer and said field winding in a side by side relationship.

8. An electric rotating machine according to claim 3 wherein the said common base plate is of a disc-like shape having a diameter substantially equal to that of either of the said field or secondary windings, and wherein said windings on said carrier are disposed on opposite sides of the said common base plate with the interconnections of the said windings passing around the edge of the said common base plate.

9. An electric rotating machine according to claim 8 wherein the said transformer, the said field winding, and the said common base plate constitute the rotating part of the machine, and wherein the said transformer primary winding is supplied with alternating current through brushes.

References Cited in the file of this patent

UNITED STATES PATENTS 2,500,802    Clark _____ Mar. 14, 1950

OTHER REFERENCES

Electronic Equipment, August 1955, pages 14–17, "Foldable Printed Circuits."

Electronics, March 20, 1959, pages 70–73, "D-C Motor Has Printed Armature."